United States Patent [19]

Perry

[11] Patent Number: 5,601,108
[45] Date of Patent: Feb. 11, 1997

[54] GAS LINE SAFETY EVACUATION APPARATUS AND METHOD

[75] Inventor: Scott M. Perry, P.O. Box 1778, Colfax, Calif. 95713

[73] Assignees: Scott M. Perry, Colfax; Georgia Carole, Valley Center; Eileen Gegax; Frank Gegax, both of San Diego; Raymond J. Patterson, Valley Center, all of Calif.

[21] Appl. No.: 578,062

[22] Filed: Dec. 20, 1995

[51] Int. Cl.⁶ ........................................... F16K 17/36
[52] U.S. Cl. .......................... 137/15; 137/38; 137/238
[58] Field of Search ........................... 137/15, 38, 238; 417/14

[56] References Cited

U.S. PATENT DOCUMENTS

| | | |
|---|---|---|
| 4,098,284 | 7/1978 | Yamada . |
| 4,414,994 | 11/1983 | Hogan . |
| 4,841,287 | 6/1989 | Flig et al. . |
| 4,852,600 | 8/1989 | Asbra et al. . |
| 4,872,490 | 10/1989 | Geisinger . |
| 4,920,999 | 5/1990 | Asbra et al. . |
| 4,979,528 | 12/1990 | Asbra et al. . |
| 5,137,047 | 8/1992 | George ................................. 137/240 |
| 5,240,024 | 8/1993 | Moore et al. . |

*Primary Examiner*—Gerald A. Michalsky
*Attorney, Agent, or Firm*—John P. O'Banion

[57] ABSTRACT

A gas line safety evacuation apparatus and method wherein earthquakes or other hazardous disruptive events are monitored and detected. Upon detection of an earthquake or like event, gas or other fluid lines are evacuated by an evacuation pump, and the evacuated gas is stored in a storage tank for future use. Control valves are activated upon detection of the earthquake to prevent additional gas or fluid from entering the lines.

20 Claims, 2 Drawing Sheets

GAS LINE SAFETY EVACUATION APPARATUS AND METHOD

BACKGROUND OF THE INVENTION

1. Field of the Invention

This invention pertains generally to safety devices and methods for use with gas lines in the event of earthquakes or other disruptive conditions, and more particularly to a gas line safety evacuation system wherein, upon detection of seismic activity, fires, or other hazards, gas or other fluid is pumped out of gas lines and stored in storage tanks.

2. Description of the Background Art

The disruption of natural gas lines due to earthquakes or other events creates a substantial danger of fire and/or explosion due to escaped flammable gas which may subsequently be ignited by sparks or electrical discharge from damaged electric lines or other sources. Particularly, gas which has escaped from damaged lines often accumulates and mixes with air within buildings or other structures, and may lead to explosions.

A variety of safety systems have been developed to close off gas lines in response to detected seismic activity or other hazardous conditions in order to avoid the aforementioned risk of fire and explosion. Previously disclosed gas safety systems, however, are deficient in that they generally provide only for the closing of gas valves to seal off a gas source, such as a trunk line, and do not provide for removal of gas which is already present in gas lines downstream from the closed valves. In many situations, a considerable amount of gas remains in the lines after shutting off valves from the gas source, and this residual gas can still lead to fires and explosions. A system is known in the semiconductor fabrication industry, for use with hazardous gases such as silane and arsine, wherein the hazardous gases are evacuated from the gas lines and vented after the gas valves are shut off in response to an earthquake or other hazardous event. This system is deficient, however, in that the vented gases, which are highly toxic, create health and environmental hazards. Additionally, high purity industrial gas materials are frequently expensive and worth recovering or retrieving from the gas lines after shutdown.

Accordingly, there is a need for a gas line safety evacuation and storage apparatus and method which provides for evacuation of residual gas from gas lines, and which provides for storage of the gas evacuated from the gas lines. The present invention satisfies these needs, as well as others, and generally overcomes the deficiencies found in the background art.

The foregoing reflects the state of the art of which the applicant is aware and is tendered with the view toward discharging applicant's acknowledged duty of candor in disclosing information which may be pertinent in the examination of this application. It is respectfully stipulated, however, that the above background art does not teach or render obvious applicant's claimed invention.

SUMMARY OF THE INVENTION

The present invention is directed to a gas line safety evacuation apparatus and method for removing gas or other fluids from gas or fluid lines in case of an earthquake or other hazardous or disruptive events. In general terms, the invention comprises (i) monitoring means for detection of hazardous events such as earthquakes, fires, and like disruptive events, (ii) evacuating means, responsive to the monitoring means, for evacuating fluid lines, and (iii) storage means for holding fluid evacuated from the lines. Preferably, the invention also includes valve means for shutting off or isolating the fluid lines from fluid sources to prevent additional fluid from reaching the evacuated lines. The invention also preferably includes control means for directing operation of the evacuation means, valve means, and storage means of the apparatus in response to hazardous disruptive events detected by the monitoring means. In the preferred embodiment, the invention is used with gas lines to evacuate and store the gas in the event of earthquakes or other hazardous conditions.

By way of example and not of limitation, the monitoring means preferably comprises a conventional laser seismic detection system or P-wave and/or S-wave transducer sensors. The monitoring means may additionally or alternatively comprise fire detection means, heat sensing means, flood sensing means, radar means for detecting hostile aircraft, and generally means for detecting events which could disrupt gas or other fluid lines. The evacuation means preferably comprises standard evacuation pump means such as resilient vane vacuum pumps or conventional liquid pumps which are strategically positioned along the gas or fluid lines of a gas or fluid supply system. The storage means preferably comprises standard metal storage tanks for holding pressurized gas or other fluids, and which are also preferably positioned in strategic locations for receiving gas or other fluid evacuated from a plurality of gas or fluid lines. The control means preferably comprises a control computer or microprocessor which is interfaced with the seismic detection means and pump means. The valve means preferably comprises solenoid actuated or pressurized gas actuated control valves, which are interfaced with the control means, and which are located to cut off or shut down gas or fluid lines from sources such as trunk lines, gas mains, or supply tanks.

The method of using the present invention generally comprises the steps of monitoring and detecting earthquakes or other hazardous disruptive events, evacuating gas or other fluid lines in response to detected earthquakes or other hazardous disruptive events, and storing the gas or other fluid evacuated from the lines. The step of shutting off or sealing of the gas lines from gas sources is also preferably included in the method comprising the present invention.

An object of the invention is to provide a gas line safety evacuation apparatus and method which, in the event of earthquakes or other disruptive hazardous events, evacuates fluid lines to eliminate the risk of fire or explosion due to residual gas or combustible hydrocarbon in the lines.

Another object of the invention is to provide a gas line safety evacuation apparatus and method in which gas evacuated from gas lines in the event of earthquake or other hazardous disruptive event is stored for future use in strategically located storage tanks.

Another object of the invention is to provide a gas line safety evacuation apparatus and method which provides for the shutting off of gas sources from gas lines in the event of earthquake or other hazardous event.

Further objects of the invention will be brought out in the following portions of the specification, wherein the detailed description is for the purpose of fully disclosing the invention without placing limits thereon.

BRIEF DESCRIPTION OF THE DRAWINGS

The invention will be more fully understood by reference to the following drawings which are for illustrative purposes only:

FIG. 3 is a flow diagram indicating generally the steps of the method comprising the invention.

DESCRIPTION OF THE PREFERRED EMBODIMENTS

Figure 1:
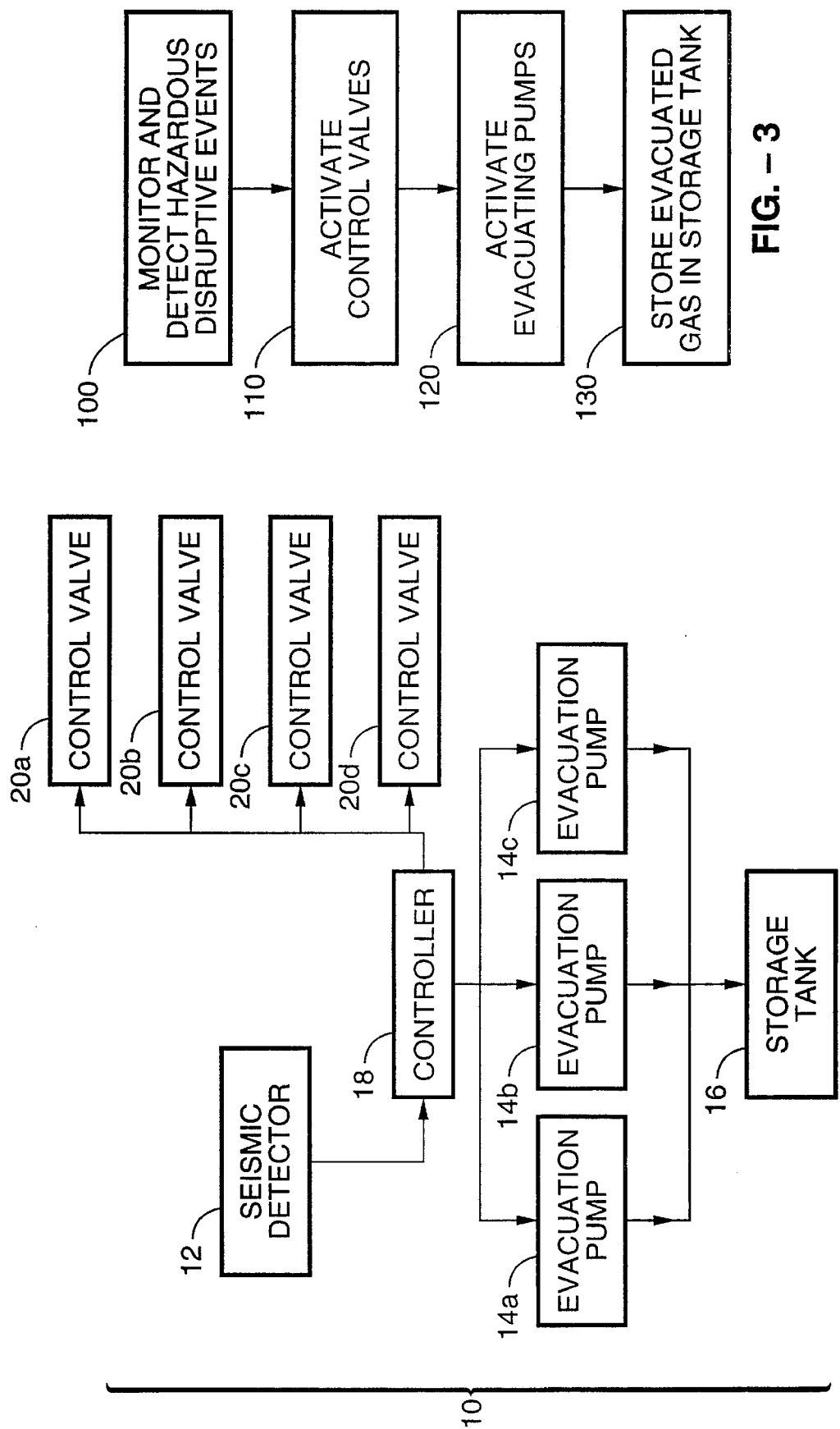
FIG. 1 is a functional block diagram of a gas line evacuation apparatus in accordance with the invention.
Figure 2:
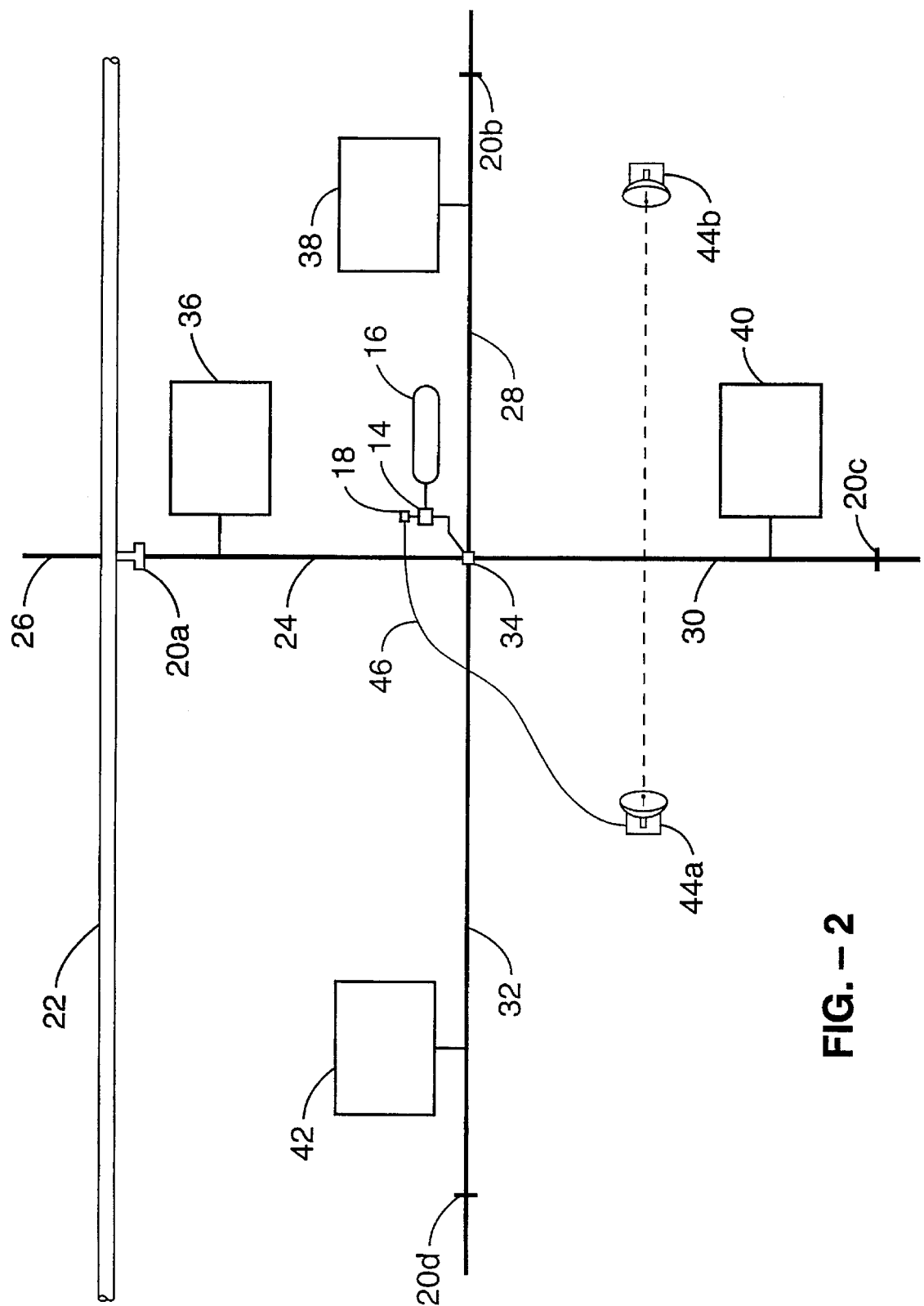
FIG. 2 is a diagrammatic view of a gas line evacuation apparatus in accordance with the present invention positioned in a gas line system.

Referring more specifically to the drawings, for illustrative purposes the present invention is embodied in the apparatus which is generally shown in FIG. 1 and FIG. 2, and the method shown generally in FIG. 3. It will be appreciated that the apparatus may vary as to configuration and as to details, and the method may vary as to details and order of steps without departing from the basic concepts as disclosed herein.

The invention is described herein generally in terms of evacuation of flammable gases such as methane, ethylene, butane, propane, hydrogen, "natural gas" or combustible hydrocarbon gas mixes from gas lines in the event of earthquakes or other seismic disturbances which may rupture the gas lines. It will be readily apparent, however, to persons of ordinary skill in the art, that the invention may be employed for evacuation of a variety of gases or fluids from gas or fluid lines in response to detection of a variety of hazardous events, as discussed further below. The terms "line" and "lines" as used herein refer generally to pipes, tubes, channels, ducts, conduits, hoses, and like means commonly used to transport or convey gases or liquids.

Referring first to FIG. 1, there is shown generally a functional block diagram of a gas line safety evacuation apparatus 10 in accordance with the present invention. Monitoring means 12 for detecting hazardous disruptive events are included with the invention, and, in the preferred embodiment, comprise a seismic detector or seismic monitoring device. Seismic detector 12 preferably comprises a conventional laser interferometric seismic monitoring device, inertial displacement device, or transducer means for detecting P-waves, S-waves and/or other earthquake propagation waves. Other monitoring means may be used for detecting additional hazards, alternatively to or in conjunction with seismic detector 12, including heat and/or smoke sensing means for fire detection, radar means for detecting hostile aircraft or air to surface missiles, and like monitoring means for detecting hazardous conditions or events which may disrupt gas or fluid lines.

The invention also comprises means for evacuating gas from gas lines. Preferably, the evacuating means comprises one or more evacuation pumps 14 which are positioned to remove gas from gas lines. The number and type of pumps will generally vary with each application of the invention, depending on the number of gas lines and gas volume to be evacuated, the structure and configuration of the gas lines, and the type of gas or other fluid to be evacuated from the lines. Evacuation pumps 14 may comprise any standard pump means for removing gas or liquids from lines. In the preferred embodiment, evacuation pumps 14 are conventional mechanical pumps such as resilient vane pumps. Evacuation pumps 14 may also be explosion proof for handling flammable or explosive gases or gas mixes. The evacuating means of the invention is responsive to seismic detector 12, and is activated upon detection of a seismic event of suitable magnitude or upon detection of other hazardous disruptive events.

Storage means for holding gas removed from gas lines by the evacuating means are also provided with the invention. The storage means preferably comprises conventional storage tanks 16 suitable for whatever gases or fluids with which the invention is utilized. For example, one or more steel storage tanks 16 suitable for holding pressurized hydrocarbon gases will generally be preferred for use with natural gas and propane lines. Liquid hydrocarbons such as oil or gasoline may be stored in conventional holding tanks.

The invention preferably includes control means 18 for directing operation of the evacuation pumps 14 and storage tank 16 in response to events detected by the monitoring means 12. The control means 18 preferably comprises a controller microprocessor or computer, which is interfaced with seismic detector 12 and evacuation pumps 14a–c, so that when seismic detector 12 detects an earthquake of a magnitude which presents a hazard, controller 18 will activate evacuation pumps 14 to remove gas from the gas lines and store the gas in storage tank 16. Controller 18 preferably includes conventional user interface means and I/O means (not shown) so that an operator may variably set threshold values for seismic detection, below which evacuation pumps 14 are not activated, so that evacuation of gas lines does not occur in response to non-hazardous seismic events or vibrations due to passing trucks and the like.

Preferably, one or more control valves 20 for shutting off gas or fluid lines from gas or fluid sources are also included with the invention. These valves preferably comprise standard solenoid-actuated or pressurized gas-actuated control valves which are interfaced with controller 18. Upon detection of an earthquake by seismic detector 12, controller 18 actuates control valves 20 at generally the same time that evacuation pumps 14 are activated, thereby preventing additional gas from entering gas lines from a gas source during or after the evacuation of gas from the lines by evacuation pumps 14. The positioning of control valves 20 will vary generally with each application of the invention, depending on the number, structure and configuration of gas lines to be evacuated. For example, in a situation where all gas lines receive gas from a single source tank or truffle line, a single control valve 20 may suffice. However, where a plurality of lines to be evacuated are in communication with a trunk line or gas main, a plurality of control valves 20 located at each point of communication with the gas source will be preferable. In situations where gas lines over a large area must be evacuated, it may be desirable to employ shutoff valves or control valves at various points in order to break up or compartmentalize the gas lines, so that each part may be separately evacuated.

Referring next to FIG. 2, there is shown a simplified system diagram of a typical installation of the present invention wherein relative sizes and distances have been exaggerated for reasons of clarity. Generally, a main gas line, trunk line, or gas main 22 will have a plurality of branching lines, shown here as gas lines 24, 26, which provide gas to various users. Gas line 24 is shown as branching into three directions as gas lines 28, 30, and 32, which are connected in flow communication with gas line 24 at junction 34. Building 36 is supplied with gas directly from line 24, building 38 receives gas from line 28, building 40 obtains gas from line 30, and building 42 is supplied with gas by line 32. Buildings 36, 38, 40, 42 may also include additional gas lines (not shown) which are in flow communication with gas lines 24, 28, 30, 32 respectively. Seismic detector 12, which can be a conventional laser interferometric system or the like having sensor stations 44a, 44b, is suitably positioned for detection of seismic disturbances. Controller 18 is interfaced with sensor stations 44a, 44b via a conventional communication link 46. Shutoff valves or control valves 20a, 20b, 20c, and 20d are each located on gas lines 24, 28, 30, 32 respectively. Control valves 20a, 20b, 20c, 20d are interfaced with controller 18 via a standard communications link. An evacuation pump 14 is positioned adjacent to junction 34, so that pump 14 may simultaneously evacuate gas from lines 24, 28, 30, 32. Evacuation pump 14 is interfaced with controller 18 by a conventional communication link (not shown). Storage tank 16 is positioned adjacent to evacuation pump 14 to receive gas therefrom.

Upon detection by stations 44a, 44b of an earthquake of a magnitude which creates a hazard of gas line disruption, controller 18 activates control valves 20a, 20b, 20c, 20d, isolating or shutting off gas lines 24, 28, 30, 32 from gas main 22 and from other gas lines generally. Controller 18 then activates evacuation pump 14, which draws or evacuates gas from lines 24, 28, 30, 32, as well as gas lines in buildings 36, 38, 40, 42, and directs the evacuated gas into storage tank 16. In the event that the detected earthquake does cause disruption of any of gas lines 24, 28, 30, 32 or gas lines within buildings 36, 38, 40, 42, no gas will remain in the lines which could then leak out at points of rupture. Thus, the danger of fire and explosion due to gas leaks from lines ruptured in earthquakes is eliminated by the present invention. Control valves 20a, 20b, 20c, 20d prevent additional gas from returning to gas lines 24, 28, 30, 32 and buildings 36, 38, 40, 42 before repairs can be effected. In the event that no damage occurs during an earthquake, the evacuated and stored gas may be returned from tank 16 to lines 24, 28, 30, 32.

As shown, evacuation pump 14 and storage tank 16 are strategically positioned to evacuate and store gas from lines 24, 28, 30, 32, and buildings 36, 38, 40, 42, through the use of only a single evacuation pump and storage tank. However, additional evacuation pumps and storage tanks could be utilized for evacuating and storing gas from the aforementioned gas lines and buildings, depending upon the length of the gas lines and overall volume of gas involved, the distance between the buildings, the presence of additional gas lines, or other factors. Thus, the arrangement of the invention shown generally in FIG. 2 is but one of many possible configurations of the invention, which will generally vary with each application.

The method of using the invention will be more fully understood by reference to FIG. 3, wherein the steps of using the invention are generally shown. At step 100, monitoring and detecting of hazardous disruptive events is carried out. As related above, in the preferred embodiment of the invention, the hazardous events to be detected and monitored generally will comprise earthquakes or like seismic disturbances. The detection is preferably carried out by standard seismic detection means as provided above. Generally, the monitoring is carried out by a system control computer which is interfaced with the seismic detection means as described above.

At step 110, activation of control valves is carried out, upon detection of an earthquake or other hazardous event in step 100, in order to shut off or isolate gas lines from gas sources, thereby preventing additional gas from entering the gas lines.

At step 120, activation of an evacuation pump or pumps is carried out in response to earthquakes or other hazardous disruptive events detected in step 100. As related above, a system controller, which is interfaced with the seismic detection means and the evacuation pumps, may be used to activate the evacuation pumps in response to detected earthquakes.

At step 130, gas evacuated in step 120 is stored in storage means such as a storage tank, as discussed above.

The step of returning stored gas back to gas lines after earthquake has ended, and inspection of lines for damage has been made, may also be included with the invention.

While the above description of the invention has been in terms of natural gas lines, the present invention may be utilized with other gases or with fluids other than gases. For example, the invention may be used with hazardous industrial gases such as arsine, phosphine, fluorine, chlorine, and like gases which pose substantial hazards in the event that a gas line is breached. The invention may also be employed in petroleum refineries, chemical processing plants, and industrial facilities wherein flammable hydrocarbon liquids or other flammable, corrosive, toxic, or otherwise hazardous fluids or liquids are present in transportation lines. The invention also reduces or eliminates risk of environmental contamination due to oil spills or other fluids from ruptured lines caused by earthquakes or like events. It will also be appreciated, that the invention can be used to protect against other hazardous events such as fires, explosions, torrential rains, winds, hurricanes and the like by employing an appropriate conventional sensing or detection device or method.

Accordingly, it will be seen that the present invention provides a gas line safety evacuation apparatus and method which prevents fire or explosion due to ruptured lines caused by earthquakes or other hazardous disruptive events. Although the description above contains many specificities, these should not be construed as limiting the scope of the invention but as merely providing illustrations of some of the presently preferred embodiments of this invention. Thus, the scope of the invention should be determined by the appended claims and their legal equivalents.

What is claimed is:

1. A fluid line evacuation apparatus, comprising:

(a) monitoring means for detecting hazardous disruptive events;

(b) means for evacuating flammable hydrocarbon fluid from fluid lines, said fluid lines communicating with at least one building, said fluid lines external to said building, said evacuating means responsive to said monitoring means; and (c) storage means for holding said flammable hydrocarbon fluid removed from said fluid lines by said evacuating means.

2. A fluid line evacuation apparatus as recited in claim 1, further comprising valve means for shutting off fluid lines from fluid sources.

3. A fluid line evacuation apparatus as recited in claim 2, further comprising control means for directing operation of said evacuating means and said valve means, said control means interfaced with said valve means, said control means interfaced with said monitoring means, said control means interfaced with said evacuating means.

4. A fluid line evacuation apparatus as recited in claim 1, further comprising control means for directing operation of said evacuating means, said control means interfaced with said monitoring means, said control means interfaced with said evacuating means.

5. A fluid line evacuation apparatus as recited in claim 1, wherein the fluid is a gas.

6. A fluid line evacuation apparatus as recited in claim 1, wherein said hazardous disruptive events are earthquakes, and said monitoring means comprises seismic monitoring means for detecting earthquakes.

7. A fluid line evacuation apparatus as recited in claim 1, wherein said storage means comprises at least one storage tank.

8. A fluid line evacuation apparatus as recited in claim 1, wherein said evacuating means comprises at least one evacuation pump.

9. A gas line evacuation apparatus, comprising:
   (a) seismic monitoring means for detecting earthquakes;
   (b) means for evacuating flammable hydrocarbon gas from gas lines, said gas lines communicating with a plurality of buildings, said gas lines external to said buildings, said evacuating means responsive to said seismic monitoring means;
   (c) storage means for holding said flammable hydrocarbon gas removed from said gas lines by said evacuating means; and
   (d) control means for directing operation of said evacuating means and said storage means, said control means interfaced with said seismic monitoring means, said control means interfaced with said evacuating means.

10. A gas line evacuation apparatus as recited in claim 9, further comprising valve means for shutting off the gas line from gas sources, said valve means responsive to said seismic monitoring means, said valve means directed by said control means.

11. A gas line evacuation apparatus as recited in claim 9, wherein said evacuating means comprises at least one evacuation pump, said evacuation pump positioned to remove gas from gas lines.

12. A gas line evacuation apparatus as recited in claim 9, wherein said control means comprises a control computer, said control computer interfaced with said seismic monitoring means, said control computer interfaced with said evacuating means.

13. A fluid line evacuation apparatus as recited in claim 9, wherein said storage means comprises at least one storage tank, said storage tank in flow communication with said evacuation means.

14. A method for evacuating fluid lines, comprising the steps of:
   (a) monitoring and detecting hazardous disruptive events;
   (b) evacuating flammable hydrocarbon fluid from fluid lines in response to detected hazardous disruptive event, said fluid lines communicating with at least one building, said fluid lines external to said building; and
   (c) storing said flammable hydrocarbon fluid evacuated from said fluid lines.

15. A method for evacuating fluid lines as recited in claim 14, further comprising the step of shutting off fluid lines from fluid sources.

16. A method for evacuating fluid lines according to claim 14, wherein said evacuating step is carried out under the direction of a control computer, said control computer interfaced with means for evacuating fluid from fluid lines, said control computer interfaced with monitoring means for detecting hazardous disruptive events.

17. A method for evacuating gas lines, comprising the steps of:
   (a) monitoring and detecting earthquakes;
   (b) evacuating flammable hydrocarbon gas from gas lines in response to detected earthquakes, said gas lines communicating with a plurality of buildings, said gas lines external to said buildings; and
   (c) storing said flammable hydrocarbon gas evacuated from said gas lines.

18. A method for evacuating gas lines as recited in claim 17, further comprising the step of shutting off gas lines from gas sources.

19. A method for evacuating gas lines according to claim 17, wherein said evacuating step is carried out under the direction of a control computer, said control computer interfaced with means for evacuating gas from gas lines, said control computer interfaced with seismic monitoring means for detecting earthquakes.

20. A method for evacuating gas lines according to claim 17, further comprising the step of returning stored gas to gas lines after an earthquake.

* * * * *